United States Patent
Santori et al.

(10) Patent No.: US 9,106,909 B2
(45) Date of Patent: Aug. 11, 2015

(54) STEREO VISION VIEWING SYSTEMS

(75) Inventors: Charles M. Santori, Palo Alto, CA (US); Jingjing Li, Palo Alto, CA (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 304 days.

(21) Appl. No.: 13/640,336

(22) PCT Filed: Apr. 20, 2010

(86) PCT No.: PCT/US2010/031688
§ 371 (c)(1),
(2), (4) Date: Oct. 10, 2012

(87) PCT Pub. No.: WO2011/133140
PCT Pub. Date: Oct. 27, 2011

(65) Prior Publication Data
US 2013/0063817 A1 Mar. 14, 2013

(51) Int. Cl.
G02B 27/24 (2006.01)
G02B 27/22 (2006.01)
G02B 5/08 (2006.01)
H04N 13/04 (2006.01)
G02B 27/01 (2006.01)

(52) U.S. Cl.
CPC ........ H04N 13/0495 (2013.01); G02B 27/0172 (2013.01); G02B 27/2278 (2013.01); H04N 13/044 (2013.01); G02B 2027/0114 (2013.01); G02B 2027/0127 (2013.01); G02B 2027/0134 (2013.01); G02B 2027/0178 (2013.01)

(58) Field of Classification Search
None
See application file for complete search history.

(56) References Cited

U.S. PATENT DOCUMENTS

2003/0071765 A1* 4/2003 Suyama et al. ............ 345/6

* cited by examiner

*Primary Examiner* — Jade R Chwasz
(74) *Attorney, Agent, or Firm* — Hewlett-Packard Patent Department

(57) ABSTRACT

Various embodiments of the present invention are directed to display systems for viewing three-dimensional images. In one aspect, a viewing system that enables a viewer to perceive depth in a three-dimensional image includes a right-eye ocular system positioned in the line of sight of the viewer's right eye, and a left-eye ocular system positioned in the line of sight of the viewer's left eye. The right-eye ocular system and the left-eye ocular system are configured to display corresponding stereo right-eye and left-eye image pairs of the three-dimensional image at various distances from the viewer's eyes.

14 Claims, 12 Drawing Sheets

STEREO VISION VIEWING SYSTEMS

TECHNICAL FIELD

Embodiments of the present invention relate to stereo display technology.

BACKGROUND

Stereopsis is a visual process in which a viewer perceives depth in an image of a scene by presenting the viewer's left-eye viewpoint with a first projection of the scene and presenting the viewer's right-eye viewpoint with a second but different projection of the same scene. Stereopsis is processed in the visual cortex in binocular cells having receptive fields in different horizontal positions in the viewer's two eyes. Binocular cells are active only when its preferred stimulus is in the correct position in the left eye and in the correct position in the right eye, making the binocular cells disparity detectors. When a viewer stares at a main object, the viewer's two eyes converge so that the object appears at the center of the retina in both eyes. Other objects around the main object appear shifted in relation to the main object. Because each eye is in a different horizontal position, each eye has a slightly different perspective on a scene yielding different retinal images. When the relative orientations of these two projections are correct, the viewer's brain ideally interprets the visual differences between the images as a single undistorted three-dimensional image.

In recent years, the advent of stereo display technologies enabling viewers to perform stereopsis with two-dimensional displays has been gaining interest and acceptance. With typical stereo display technology, viewers are required to wear eye glasses that control the visual content delivered to each eye. However, it is typically the case that the relative orientations of the projections received by the viewer are correct only for certain viewing locations, such as locations where a viewer's view is orthogonal to the center of a display. By contrast, viewers watching the same display outside these viewing locations experience a re-projection error that manifests as a vertical misalignment of the visual content received by the eyes of the viewers. If the images are very different, then in some cases one image at a time may be seen, a phenomenon known as binocular rivalry. Another type of visual artifact in typical stereo display technologies is that foreground and background objects often appear with the same focus. In order to produce a realistic three-dimensional viewing experience close objects should appear out of focus when the viewer focuses on more distant objects in the same image, and vice versa. These kinds of visual artifacts can be distracting and are cumulative to most viewers, leading to eye strain, nausea, fatigue, and possibly rejection of the stereo display technology. Thus, mere below threshold objectionableness may not be sufficient for permitting the presence of such artifacts.

Designers and manufacturers of stereo display systems continue to seek improvements that reduce the adverse effects associated with typical stereo display technology.

DETAILED DESCRIPTION

Figure 1A:
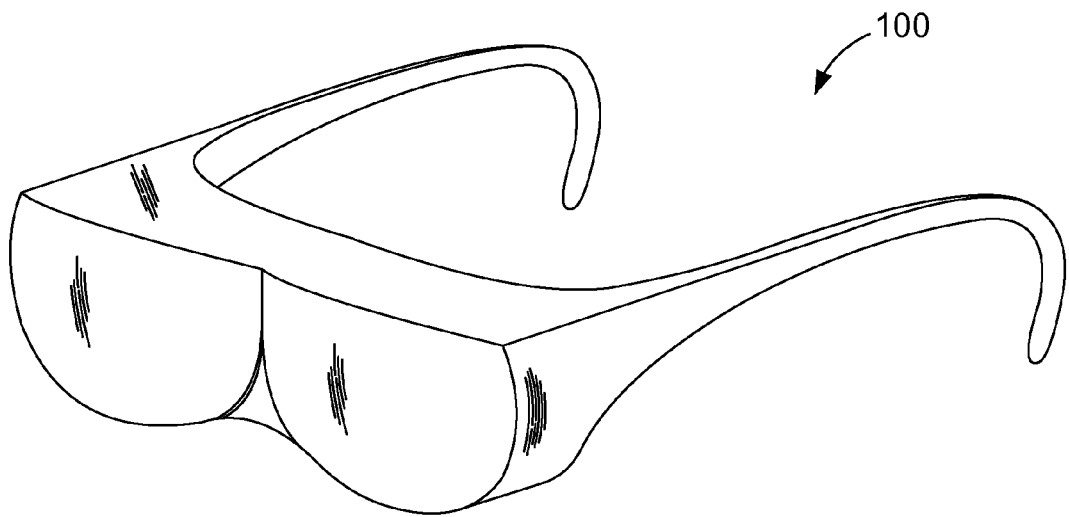
FIGS. 1A-1B show an isometric view and a top plan view of an example three-dimensional display system configured in accordance with one or more embodiments of the present invention.
Figure 1B:
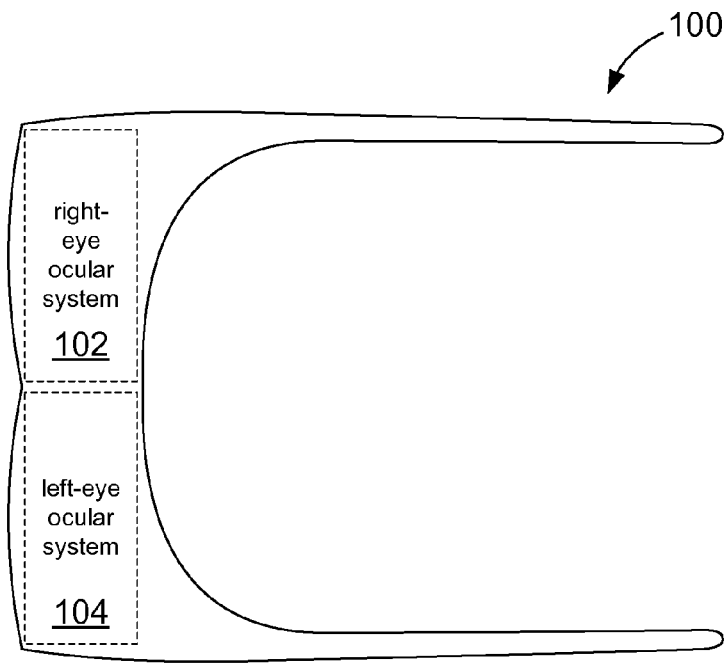

Various embodiments of the present invention are directed to display systems for viewing three-dimensional images. The display systems can be implemented in a headset worn by a viewer. FIGS. 1A-1B show an isometric view and a top plan view of an example three-dimensional display system 100 configured in accordance with one or more embodiments of the present invention. As shown in FIG. 1A, the display system 100 is implemented as a headset that resembles eye glasses configured to substantially encase the viewer's eyes to prevent extraneous light from entering the headset and interfering with images presented to the viewer's eyes. The top plan view shown in FIG. 1B reveals that the display system 100 includes separate ocular systems identified as a right-eye ocular system 102 and a left-eye ocular system 104. The right-eye and left-eye ocular systems 102 and 104 are configured and operated to produce stereo right-eye and left-eye image pairs. The viewer experiences a realistic three-dimensional viewing experience because the right-eye and left-eye ocular systems present the viewer with images of objects in a scene at different distances from the viewer's eyes. The ocular systems enable the viewer to focus on stereo image pairs of particular objects, while objects located at other distances appear out of focus. In other words, as part of the three-dimensional viewing experience, the ocular systems 102 and 104 can be operated so that a viewer can focus on foreground, background, and intermediate objects of a scene.

Headset embodiments of the present invention are not limited to resembling eye glasses. In other embodiments, in an attempt to entirely eliminate extraneous light from entering the display system, the headset can be configured to resemble eye goggles that fully encase the viewer's eyes and orbits. In still other embodiments were extraneous light may not be an appreciable issue, the headset can be configured to resemble a visor with the right-eye and left-eye ocular systems suspended from a visor in front of the right eye and left eye of the viewer.

Figure 2:
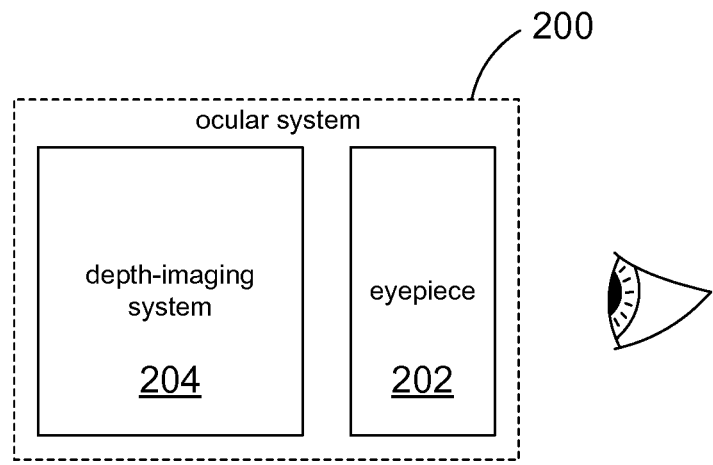
FIG. 2 shows a schematic representation of an ocular system configured in accordance with one or more embodiments of the present invention.

FIG. 2 shows a schematic representation of an ocular system 200 configured in accordance with one or more embodiments of the present invention. The ocular system 200 can be operated as a right-eye ocular system or a left-eye ocular system in the headsets described above with reference to FIG. 1. The ocular system 200 includes an eyepiece 202 and a depth-imaging system 204. The depth-imaging system 204 is configured to display images of various objects of a scene at different distances from the viewer's eye, and the viewer uses the eyepiece 202 to focus on the images.

Figure 3:
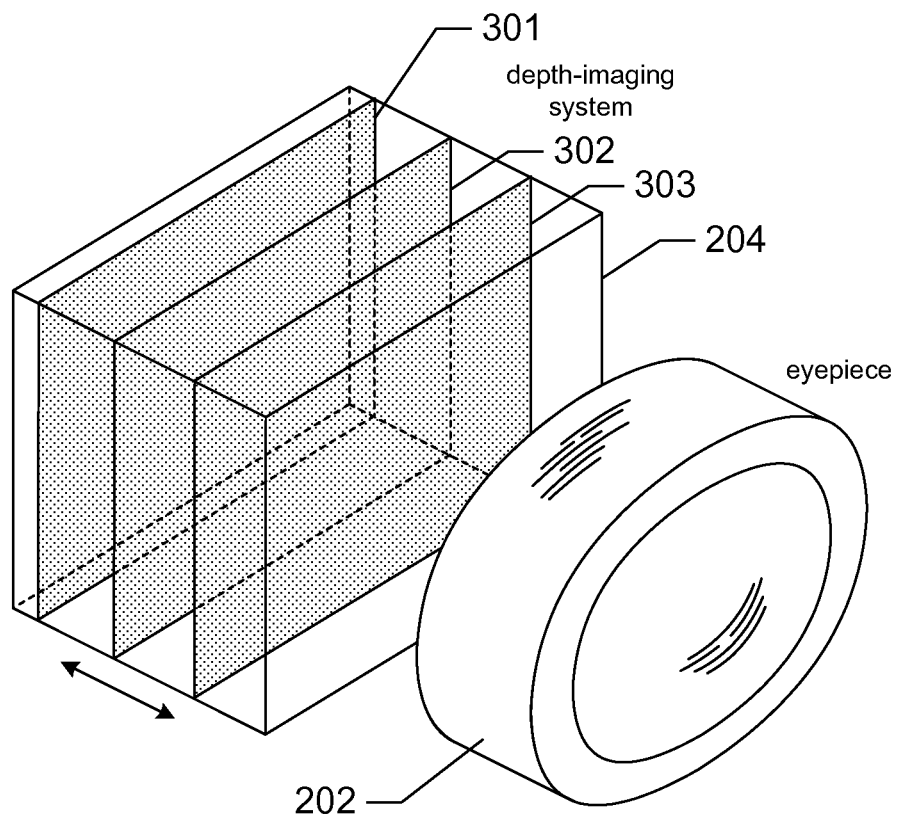
FIG. 3 shows an isometric view and schematic representation of an ocular system configured in accordance with one or more embodiments of the present invention.

FIG. 3 shows an isometric view and schematic representation of the ocular system 200 in operation. In order to create depth in an image of a scene, the depth-image system 204 displays various images of the scene along the line sight of a viewer looking through the eyepiece, each image displaying objects at different distances from the eyepiece 202. In the example of FIG. 3, depth-imaging system 204 displays three separate images 301-303 located along the line of sight of a viewer looking through the eyepiece 202. Each image is located at a different distance from the eyepiece 202 enabling each image to display objects of the same scene at different distances from the eyepiece 202. For example, objects displayed in the image 303 appear closer to the viewer than do objects displayed in the image 301.

In certain embodiments, the eyepiece 202 is fixed. The effective focal length of the eyepiece 202 can be fixed so that objects displayed in the image 301 appear to be infinitely far away, in terms of focus, while objects in closer displayed images 302 and 303 appear closer. In other words, the focal length of the eyepiece 202 is approximately equal to the distance between image 301 and the eyepiece 202. With the eyepiece 202 fixed, the viewer decides which image to focus on by adjusting his/her individual eye focus, just as an individual does in real life. For example, the viewer can perceive depth in the scene by 1) focusing on image 303 to perceive close-up objects, 2) focusing on image 302 to perceive medium range objects, and 3) focusing on image 301 to perceive far away objects. Embodiments of the present invention may also include separate adjustment knobs (not shown) for the left- and right-ocular systems allowing the viewer to separately adjust the focal length of each eyepiece to accommodate for visual disparity in the viewer's eyes.

Displaying the images 301-303 at various distances from the viewer's eye can be encoded in instructions associated with a motion picture, set of images, video game, or other types of video display media. For example, instructions for determining which objects in scenes of a motion picture get displayed in the images 301-303 can be encoded in the motion picture data.

Various embodiments for implementing the viewing system 100 and the ocular systems 102 and 104 are now described with reference to FIGS. 4-14.

Figure 4:
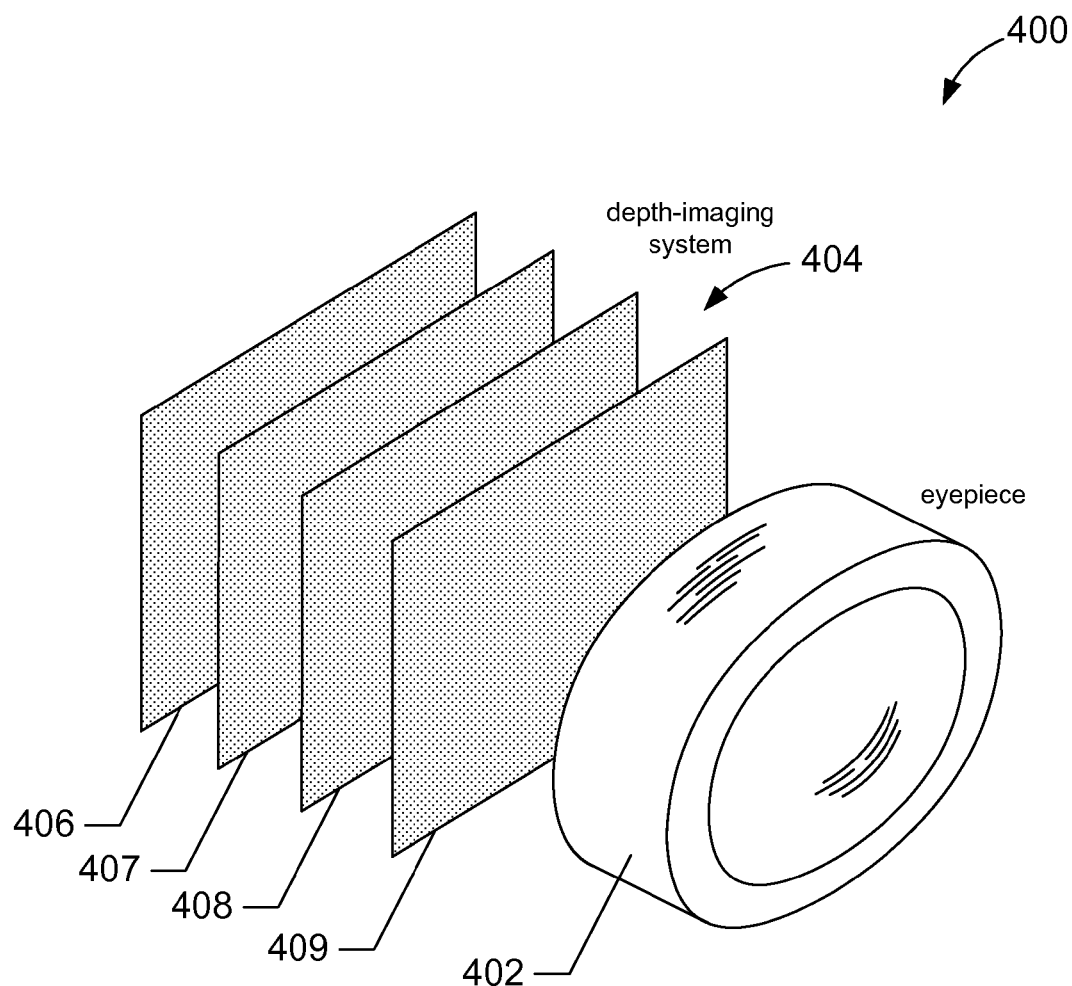
FIG. 4 shows an example first ocular system configured in accordance with one or more embodiments of the present invention.

FIG. 4 shows an example ocular system 400 configured in accordance with one or more embodiments of the present invention. The ocular system 400 includes an eyepiece 402 and a depth-imaging system 404. In the example of FIG. 4, the depth-imaging system 404 includes a pixel array 406 and three two-dimensional emissive pixel arrays 407-409. The pixel arrays 406-409 are located along the line of sight of a viewer looking through the eyepiece 402. Each emissive pixel array is configured to display an image and transmit images displayed by the one or more pixel arrays located behind it. In certain embodiments, the emissive pixels arrays 407-409 can be composed of an array of transparent light-emitting devices. For example, the light-emitting devices can be primary color (e.g., red, green, or blue) organic light-emitting devices that are grouped to form color pixels and are sandwiched between transparent or semi-transparent contacts. The emissive pixel array can be composed of primary color light-emitting diodes ("LED") that are grouped to form color pixels and sandwiched between transparent or semi-transparent contacts or a liquid crystal display ("LCD"). For pixels of the LED-based, or LCD-based, emissive pixel arrays 407-409, the color pixels are spaced to allow transmission of light from pixel arrays located behind it. The pixel array 406 located farthest from the eyepiece 402 can be an LED or an LCD display and does not also have to be transparent.

Figure 5A:
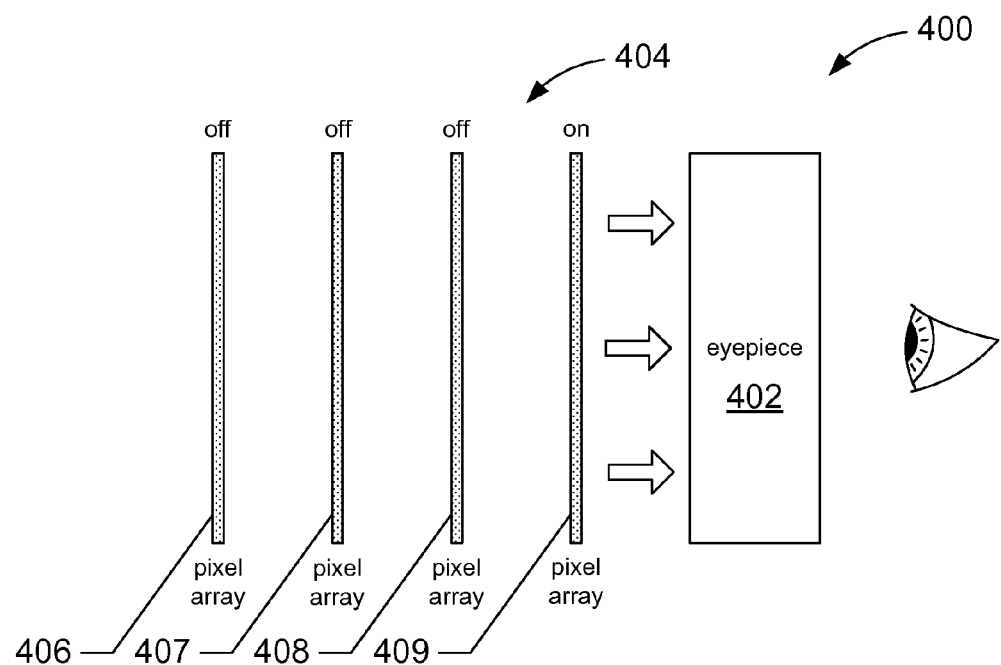
FIGS. 5A-5B show side views of the first ocular system operated in accordance with one or more embodiments of the present invention.
Figure 5B:
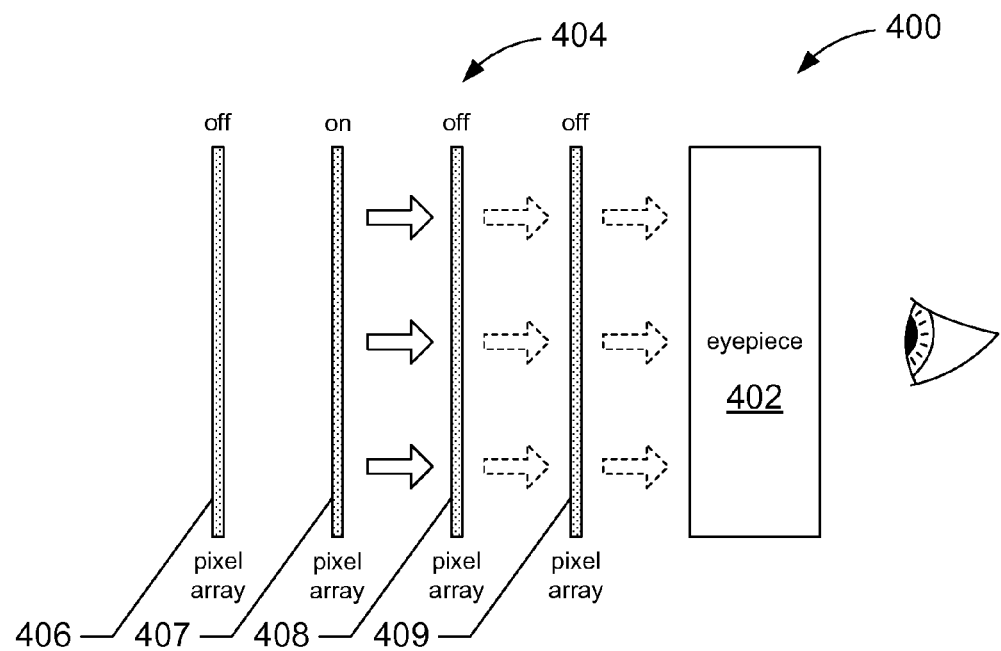

FIGS. 5A-5B show side views of the ocular system 400 operated in accordance with one or more embodiments of the present invention. A turned "on" pixel array displays objects of a scene that appear to a viewer to be located at a particular distance from the viewer. For example, in FIG. 5A, pixel arrays 406-408 are turned "off." In other words, pixel arrays 406-408 are not operated to display images of a scene. On the other hand, pixel array 409 is turned "on" to display objects of the scene that appear close to the viewer. The viewer looks through the eyepiece 402 and focuses on the image displayed on the pixel array 409. In order to create depth in the image, in FIG. 5B, arrays 406, 408, and 409 are turned "off" and the pixel array 407 is turned "on." The image displayed on the pixel array 407 can be of objects that appear farther from the viewer than the objects displayed in pixel array 409. The image is transmitted through the pixel arrays 408 and 409. In other embodiments, two or more of the pixels arrays can be simultaneously turned "on." For example, suppose pixel array 407 displays objects of a scene that are to appear farther away from the viewer than are different objects of the same scene displayed in the pixel array 409. Depth can be created when the viewer focuses on particular objects displayed in the pixel array 407 and then switches to viewing the objects displayed in the pixel array 409.

Figure 6:
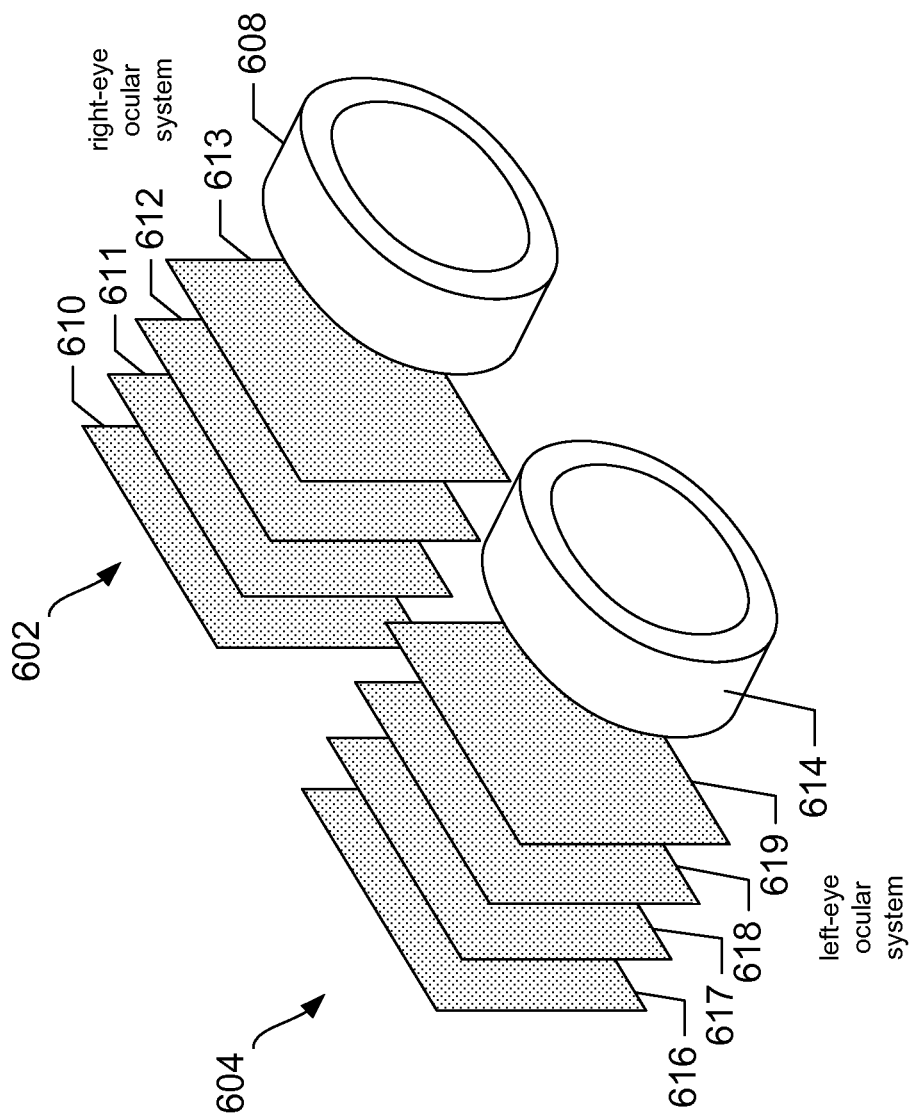
FIG. 6 shows a three-dimensional display system configured with two of the first ocular systems in accordance with one or more embodiments of the present invention.

In order to create a three-dimensional viewing experience with depth focusing, stereo right-eye and left-eye image pairs ("stereo image pairs") at different depths can be displayed on the pixel arrays of the right-eye and left-eye depth-image systems. FIG. 6 shows a right-eye ocular system 602 and a left-eye ocular system 604 of a three-dimensional display system configured and operated in accordance with one or more embodiments of the present invention. The right-eye ocular system 602 includes an eyepiece 608 and a depth-imaging system composed of four pixel arrays 610-613 configured and operated as described above with reference to FIGS. 4-5. The left-eye ocular system 604 includes an eyepiece 614 and a depth-imaging system composed of four pixel arrays 616-619 also configured and operated as described above with reference to FIGS. 4-5. The left-eye pixel arrays 616-619 show left-eye view points of objects of a scene at various depths, and the right-eye pixel arrays 610-613 show right-eye view points of objects of the same scene at various depths. The right-eye and left-eye ocular systems 602 and 604 can be operated to produce a three-dimensional viewing experience by displaying stereo image pairs of objects and backgrounds that are supposed to appear farthest from a viewer in the pixel arrays 610 and 616. Stereo image pairs of objects in the scene that appear closest to the viewer are displayed in the pixel arrays 613 and 619. Stereo image pairs of objects that appear at intermediate distances from the viewer can be displayed on the pixel arrays 611 and 617 and/or 612 and 618. In order to create depth, the viewer selectively focuses on different stereo image pairs.

Note that the ocular system 400 is presented as an example embodiment and similarly configured ocular systems are not limited to three emissive pixel arrays. In other embodiments, an ocular system can be configured with any suitable number of emissive pixels arrays. For example, certain ocular systems can be composed of as few as two emissive pixel arrays while other ocular systems can be composed of four or more emissive pixel arrays.

Figure 7:
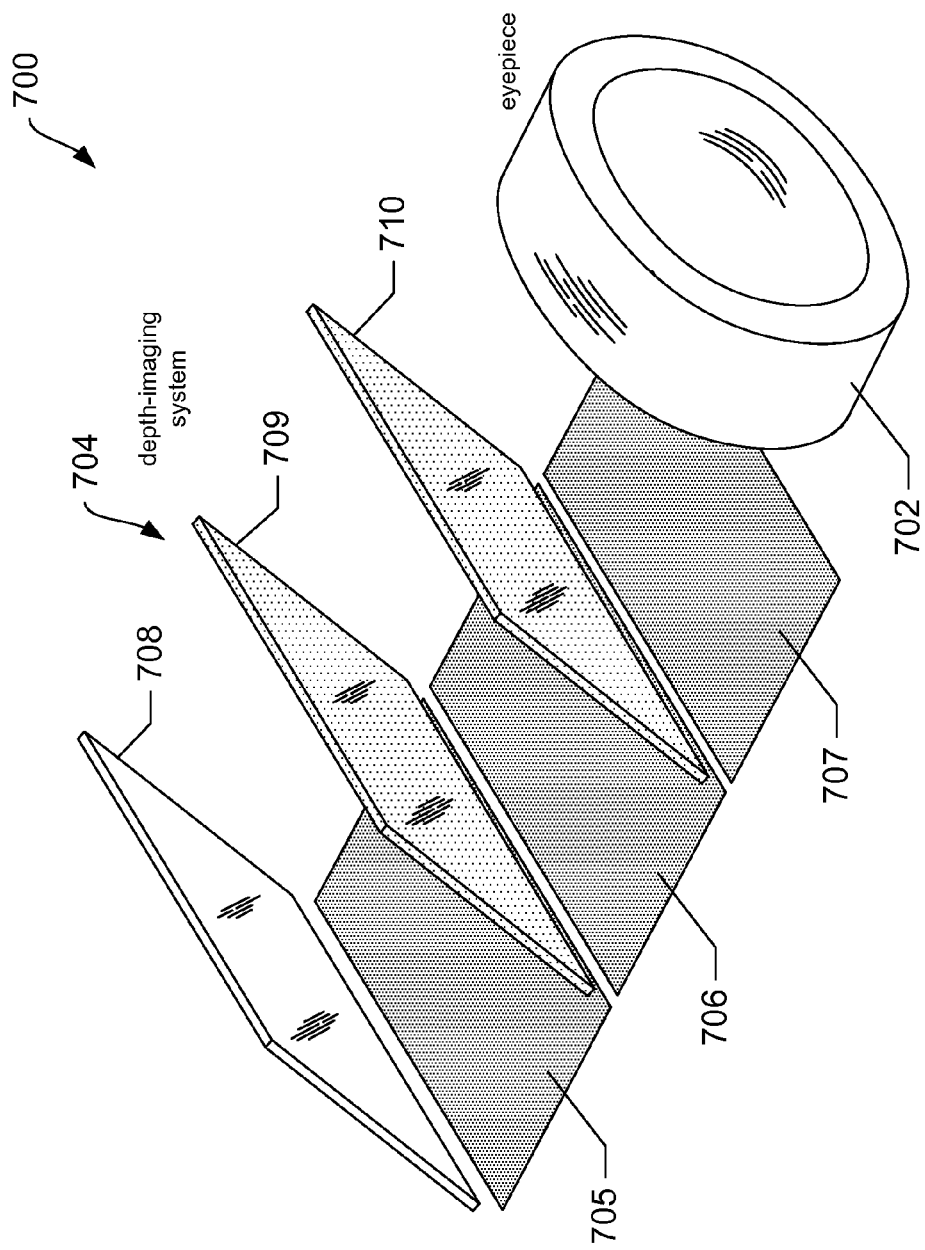
FIG. 7 shows an example second ocular system configured in accordance with one or more embodiments of the present invention.

FIG. 7 shows an example ocular system 700 configured in accordance with one or more embodiments of the present invention. The ocular system 700 includes an eyepiece 702 and a depth-imaging system 704. The depth-imaging system 704 includes three pixel arrays 705-707, a mirror 708, and two dichroic mirrors 709 and 710. The pixel arrays 705-707 can be LED or LCD displays. Each pixel array 705-707 is configured with primary color pixels that emit light in different red, green, and blue portions of the visible portion of the electromagnetic spectrum. The mirrors 708-710 are oriented to reflect images along the line of sight of a viewer looking through the eyepiece 702.

Figure 8A:
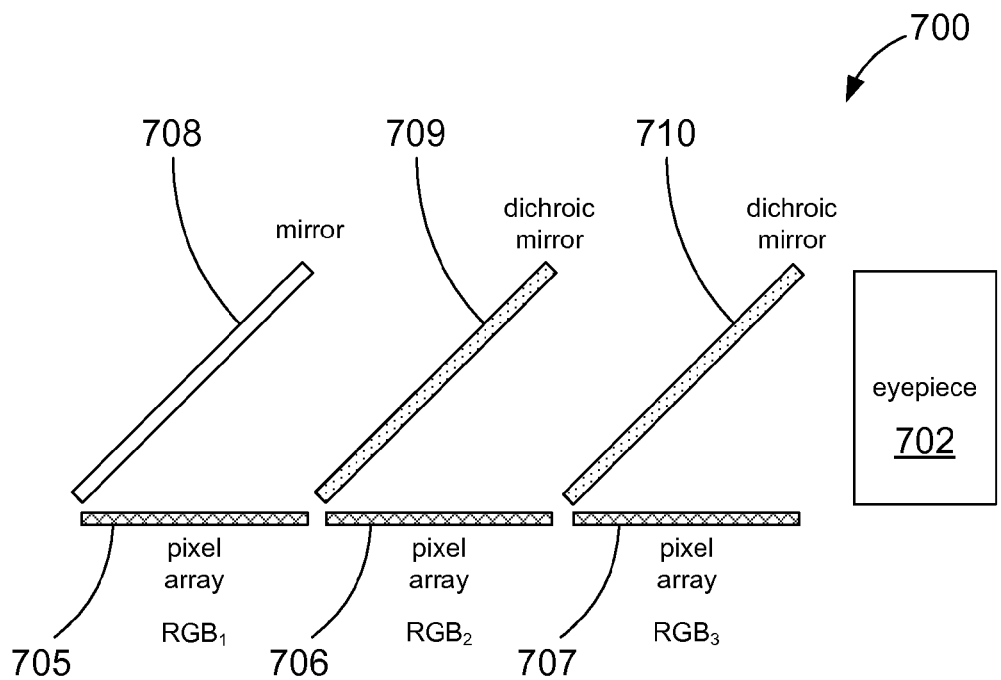
FIG. 8A shows a side view of the second ocular system operated in accordance with one or more embodiments of the present invention.
Figure 8B:
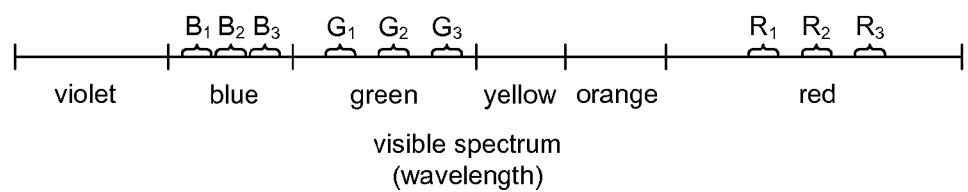
FIG. 8B shows a representation of example portions of the electromagnetic spectrum used to implement the second ocular system in accordance with one or more embodiments of the present invention.

FIG. 8A shows a side view of the ocular system 700 operated in accordance with one or more embodiments of the present invention. Pixel array 705 is configured with red, green, and blue pixels that emit light using a first set of wavelengths denoted by $RGB_1$; pixel array 706 is configured with red, green, and blue pixels that emit light using a second set of wavelengths denoted by $RGB_2$; and pixel array 707 is configured with red, green, and blue pixels that emit light using a third set of wavelengths denoted by $RGB_3$. FIG. 8B shows an example representation of the visible portion of the electromagnetic spectrum and identifies example portions of the electromagnetic spectrum corresponding to the $RGB_1$, $RGB_2$, and $RGB_3$ sets of wavelengths. For example, red, green, and blue portions of the visible spectrum, denoted by $R_1$, $G_1$, and $B_1$, form the set of wavelengths $RGB_1$. Color images are produced by the pixel array 705 using pixels that emit red light in the $R_1$ portion of the visible spectrum, emit green light in the $G_1$ portion of the visible spectrum, and emit blue light in the $B_1$ portion of the visible spectrum.

Figure 9:
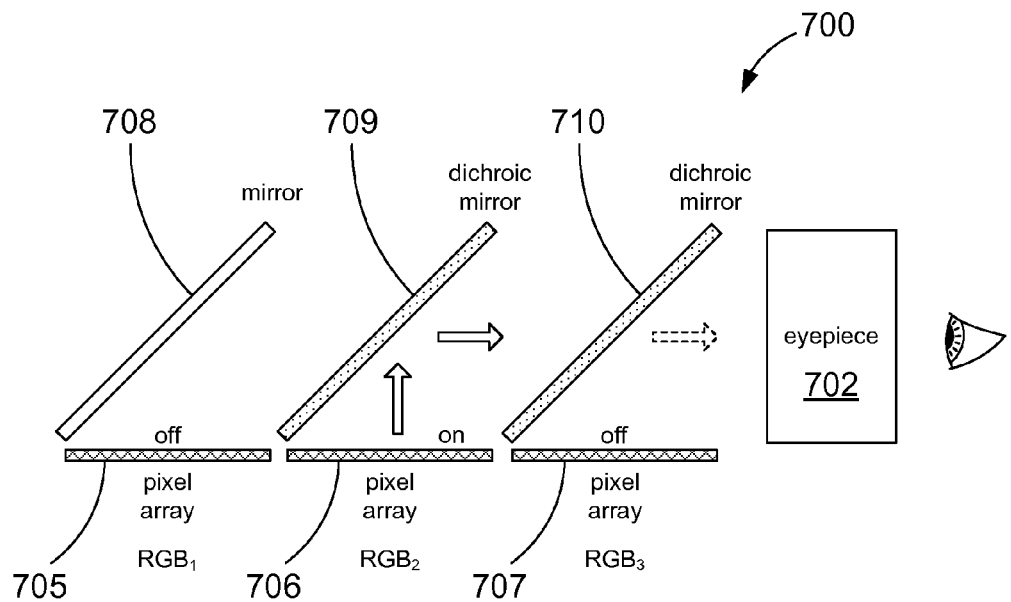
FIG. 9 shows a side view of the second ocular system operated in accordance with one or more embodiments of the present invention.

FIG. 9 shows a side view of the ocular system 700 operated in accordance with one or more embodiments of the present invention. The mirror 708 is positioned to reflect images displayed by the pixel array 705 toward the eyepiece 702. The dichroic mirror 709 is a partially reflective mirror configured to reflect wavelengths in the set $RGB_2$ and transmit wavelengths in the set $RGB_1$. In other words, the dichroic mirror 709 transmits images produced by the pixel array 705 and reflects images produced by the pixel array 706 toward the eyepiece 702. The dichroic mirror 710 is a partially reflective mirror configured to reflect wavelengths in the set $RGB_3$ and transmit wavelengths in the sets $RGB_1$ and $RGB_2$. In other words, the dichroic mirror 710 transmits images produced by the pixel arrays 705 and 706 and reflects images produced by the pixel array 707 toward the eyepiece 702.

In certain embodiments, the pixel arrays 705-707 can be operated separately, where each turned "on" pixel array displays objects of the same scene at different distances from the viewer's eye. For example, as shown in the example of FIG. 9, the pixel array 706 displays an image that is reflected off of the dichroic mirror 709, and the pixel arrays 705 and 706 are turned "off." In other embodiments, two or more of the pixels arrays can be simultaneously turned "on." For example, all three of the pixel arrays 705-707 can be turned "on" to display different objects of a scene that appear at different distances from the viewer's eye.

Figure 10:
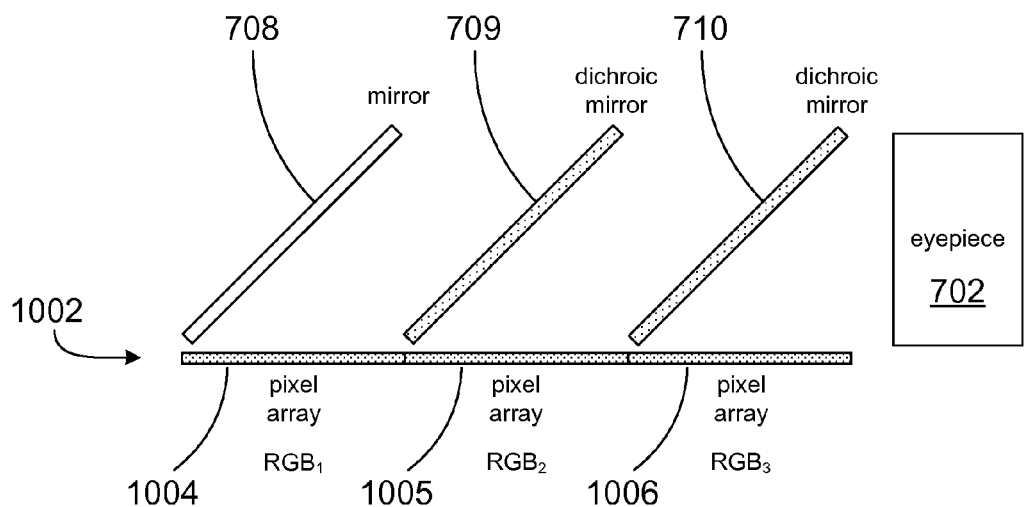
FIG. 10 show a side view of a third ocular system operated in accordance with one or more embodiments of the present invention.

In other embodiments, rather than using three separate pixel arrays 705-707, a single pixel array configured with three separate zones can be used, each zone is configured to display an image using one of the three sets of wavelengths $RGB_1$, $RGB_2$, and $RGB_3$. FIG. 10 show a side view of an ocular system 1000 operated in accordance with one or more embodiments of the present invention. The ocular system 1000 includes the eyepiece 702 and mirrors 708-710, but the three separate pixel arrays 705-707 of the ocular system 700 have been replaced by a single pixel array 1002. The pixel array 1002 is composed of three separate zones 1004-1006. The zones 1004-1006 are configured with red, green, and blue pixels corresponding to the sets $RGB_1$, $RGB_2$, and $RGB_3$, respectively, and can be operated in the same manner as the pixel arrays 705-707, as described above with reference to FIG. 9.

Figure 11:
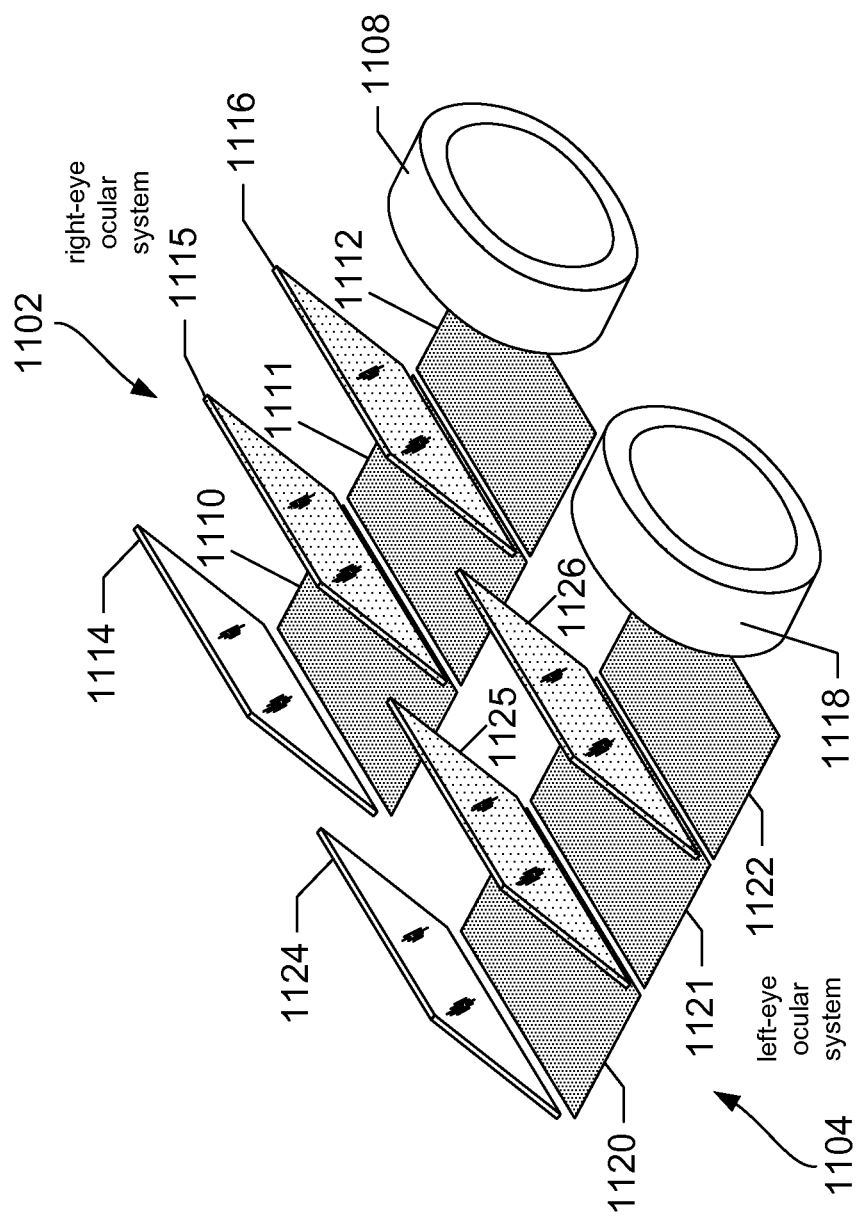
FIG. 11 shows a three-dimensional display system configured with two of the second ocular systems in accordance with one or more embodiments of the present invention.

FIG. 11 shows a right-eye ocular system 1102 and a left-eye ocular system 1104 of a three-dimensional display system configured and operated in accordance with one or more embodiments of the present invention. The right-eye ocular system 1102 includes an eyepiece 1108 and a depth-imaging system composed of three pixel arrays 1110-1112, mirror 1114, and dichroic mirrors 1115 and 1116, as described above with reference to FIGS. 7-8. The left-eye ocular system 1104 includes an eyepiece 1118 and a depth-imaging system composed of three pixel arrays 1120-1122, mirror 1124, and dichroic mirrors 1125 and 1126, as described above with reference to FIGS. 7-8. The left-eye pixel arrays 1120-1122 show left-eye view points of objects of a scene at various depths, and the right-eye pixel arrays 1110-1112 show right-eye view points of objects of the same objects and scene at various depths. The right-eye and left-eye ocular systems 1102 and 1104 can be operated to produce a three-dimensional viewing experience by displaying stereo image pairs of objects and backgrounds that are supposed to appear farthest from a viewer in the pixel arrays 1110 and 1120. Stereo image pairs of objects in the scene that appear closest to the viewer are displayed in the pixel arrays 1112 and 1122. Stereo image pairs of objects that appear at intermediate distances from the viewer can be displayed on the pixel arrays 1111 and 1121. In order to create depth, the viewer selectively focuses on different stereo image pairs.

Note that the ocular system 700 is presented as an example embodiment and similarly configured ocular systems are not limited to three pixel arrays and corresponding mirrors. In other embodiments, an ocular system can be configured with any suitable number of pixels arrays and corresponding mirrors. For example, certain ocular systems can be composed with as few as two pixel arrays while other ocular systems can be composed of four or more pixel arrays.

Figure 12A:
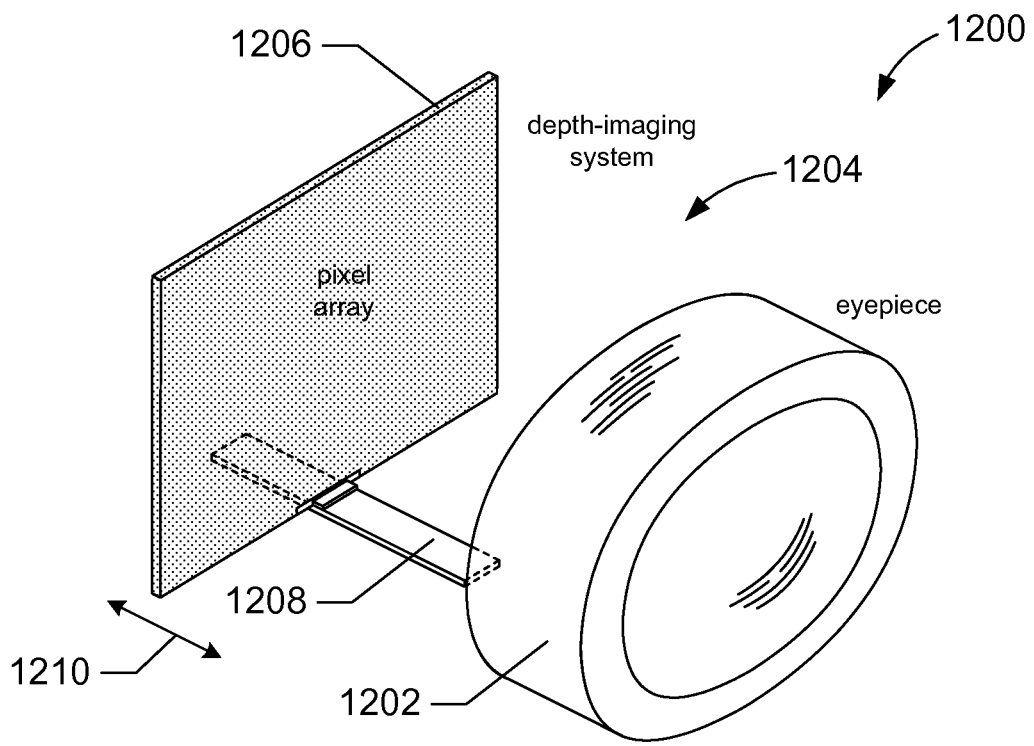
FIGS. 12A-12B show isometric and side views of a fourth ocular system configured in accordance with one or more embodiments of the present invention.
Figure 12B:
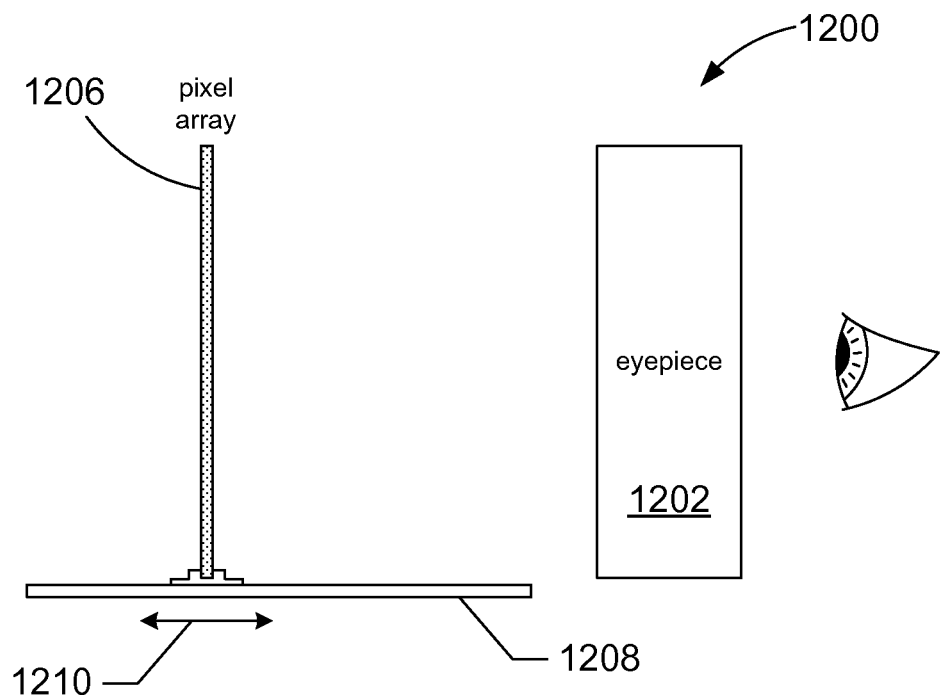

FIGS. 12A-12B show isometric and side views of an example ocular system 1200 configured in accordance with one or more embodiments of the present invention. The ocular system 1200 includes an eyepiece 1202 and a depth-imaging system 1204. The depth-imaging system 1204 includes a single pixel array 1206 mounted on a mechanized platform 1208 for sliding the pixel array 1206 toward and away from the eyepiece 1202, as represented by directional arrow 1210.

Figure 13:
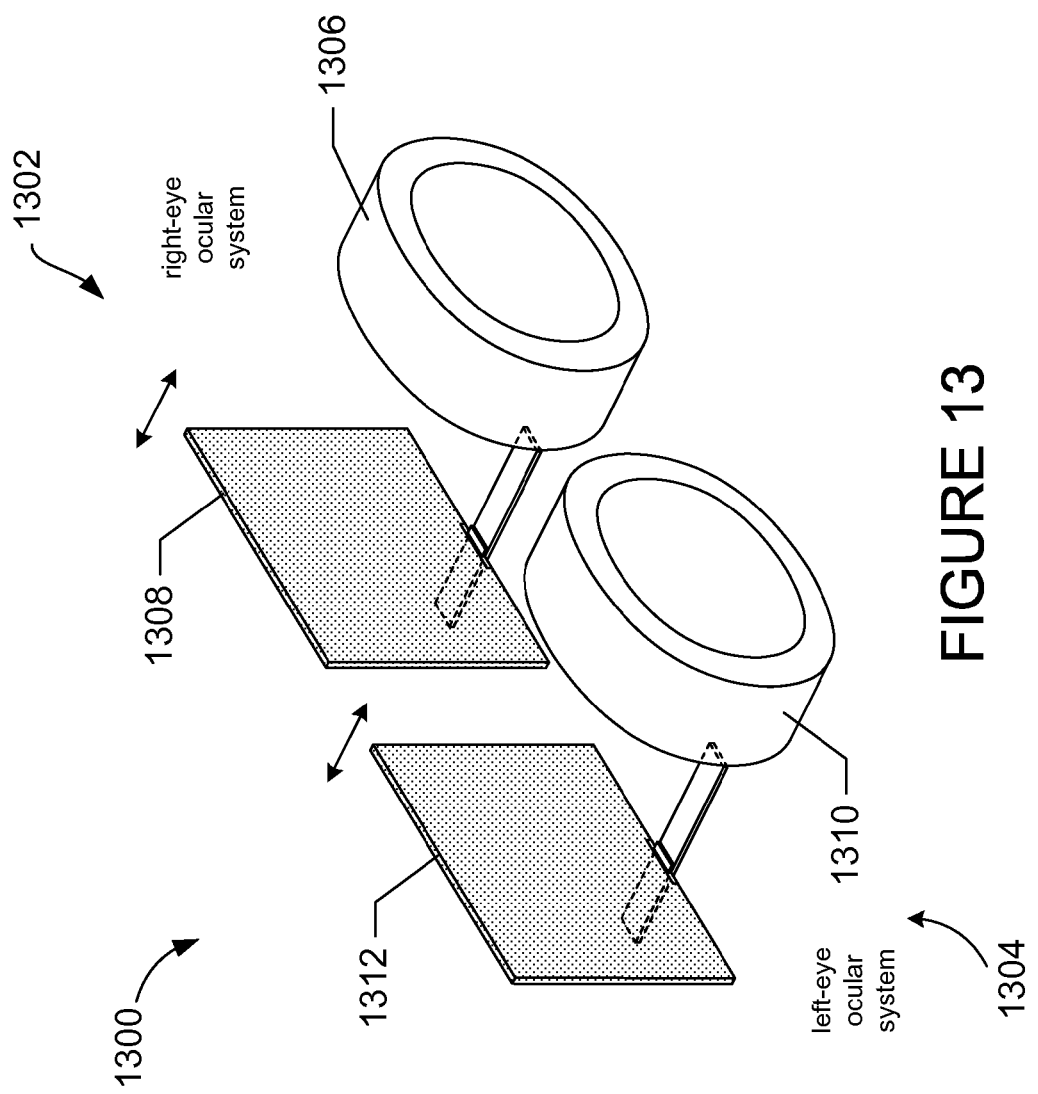
FIG. 13 shows a three-dimensional display system configured with two of the fourth ocular systems in accordance with one or more embodiments of the present invention.

FIG. 13 shows a right-eye ocular system 1302 and a left-eye ocular system 1304 of a three-dimensional display system configured and operated in accordance with one or more embodiments of the present invention. The right-eye ocular system 1302 includes an eyepiece 1306 and a depth-imaging system comprising a pixel array 1308 mounted on a mechanized platform. The left-eye ocular system 1304 includes an eyepiece 1310 and a depth-imaging system comprising a pixel array 1308 mounted on a mechanized platform. The ocular systems 1302 and 1304 are operated as described above with reference to FIG. 12. The left-eye pixel array 1312 shows left-eye view points of a scene, and the right-eye pixel array 1308 shows right-eye view points of the same scene. The right-eye and left-eye ocular systems 1302 and 1304 can be operated to produce a three-dimensional viewing experience with depth focusing by displaying stereo image pairs of objects and backgrounds that are supposed to appear farthest from a viewer by moving the pixel arrays 1308 and 1312 away from the eyepieces 1306 and 1310. Stereo image pairs of objects in the scene that appear closest to the viewer are displayed by moving the pixel arrays 1308 and 1312 closer to the eyepieces 1306 and 1310

Figure 14A:
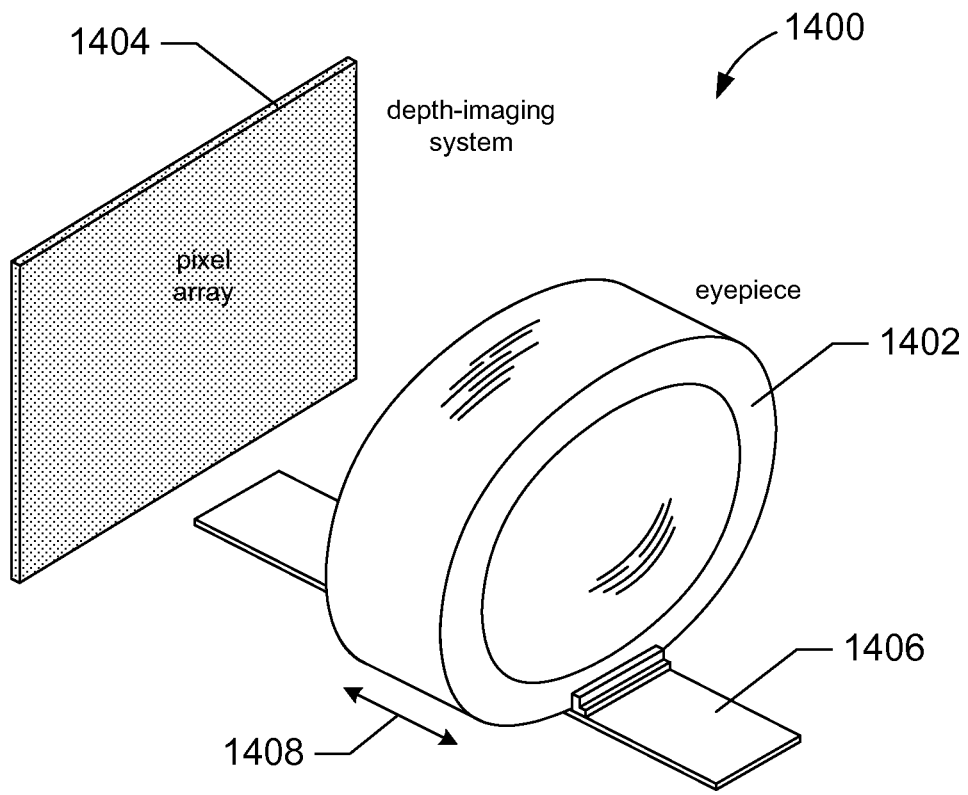
FIGS. 14A-14B show isometric and side views of a fifth ocular system configured in accordance with one or more embodiments of the present invention.
Figure 14B:
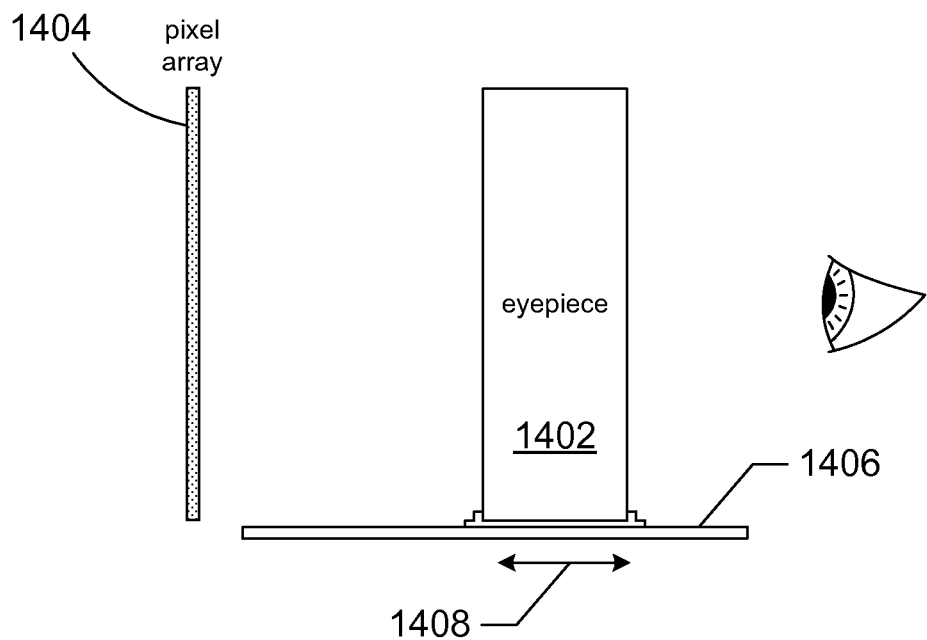

FIGS. 14A-14B show isometric and side views of an example ocular system 1400 configured in accordance with one or more embodiments of the present invention. The ocular system 1400 includes an eyepiece 1402 and a fixed pixel array 1404. The eyepiece 1404 is mounted on a mechanized platform 1406 for sliding the eyepiece 1402 toward and away from the pixel array 1404, as represented by directional arrow 1408. The ocular system 1400 can be implemented in a three-dimensional display system analogous to the left- and right-ocular systems 1302 and 1304 shown in FIG. 13 but with the eyepieces moved to control the distance to the stereo image pair displayed on the associated pixel arrays. In other embodiments, the eyepiece of the ocular system 1400 can be configured to focus the viewer's eye onto a particular image. For example, the eyepiece can be mechanically operated or the eyepiece can be a liquid-crystal lens. Depth in the scene can be created by operating the eyepiece to focus on one image and switch focus to a different image. For example, when the eyepiece is operated to switch focus from a first image to a second image located closer to the viewer's eye, objects in the second image appear closer to the viewer than do objects in the first image.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A viewing system that enables a viewer to perceive depth in a three-dimensional image, the system comprising:

a right-eye ocular system positioned in the line of sight of the viewer's right eye; and a left-eye ocular system positioned in the line of sight of the viewer's left eye, wherein the right-eye ocular system and the left-eye ocular system are configured to display corresponding stereo right-eye and left-eye image pairs of the three-dimensional image, each stereo image pair displayed at a different distance from the viewer's eyes such that the viewer perceives depth by focusing on a particular stereo image pair so that objects displayed in the particular stereo image pair appear in focus;

a first pixel array and one or more additional pixel arrays adjoining the first pixel array, where each of the first pixel array and each of the one or more additional pixel arrays are arranged in a coplanar manner; and a first mirror corresponding to the first pixel array and one or more dichroic mirrors corresponding to the respective one or more additional pixel arrays, wherein each mirror is oriented to direct light emitted from the respective pixel array to the eyepiece.

2. The viewing system of claim 1, wherein each of the ocular systems further comprise a depth-imaging system comprising the arrangement of the pixel arrays and mirrors, wherein the depth-imaging system is configured to display images of various objects of a scene at different distances from the eyepiece.

3. The viewing system of claim 2, wherein each of the additional pixel arrays is configured to display a respective image and transmit another image to the eyepiece as displayed by the one or more distal pixel arrays relative to the eyepiece with respect to the corresponding pixel array.

4. The viewing system of claim 2, wherein each pixel array displays an image, the dichroic mirrors are positioned between the mirror and the eyepiece, and the mirrors are oriented to reflect an image displayed by one of the pixel arrays along an optical through the eyepiece.

5. The viewing system of claim 4, wherein each pixel array further comprises red, green, and blue pixels that emit light in different red, green, and blue portions of the visible portion of the electromagnetic spectrum.

6. The viewing system of claim 4, wherein each pixel array further comprises a single pixel array arranged in a plurality of portions corresponding to the respective first and additional pixel arrays such that each portion can be independently operated to display an image.

7. The viewing system of claim 6, wherein the dichroic mirrors are configured to reflect the image displayed by an associated portion of the single pixel array and transmit images displayed by the other portions of the single pixel arrays.

8. The viewing system of claim 6, wherein a given portion of the single pixel array displays a given image at a given distance from the eyepiece and another portion of the single pixel array displays another image at another distance from the eyepiece.

9. The viewing system of claim 2, wherein the depth-imaging system further comprises:

a pixel array; and a mechanized platform coupled to the pixel array, wherein the pixel array is configured to display images of various objects of a scene, the mechanized platform is configured to move the pixel array to display the images at different distances from the viewer's eye, and the eyepiece is configured to adjust the focus of the viewer's eye onto the image.

10. The viewing system of claim 2, the depth imaging system further comprising a mechanized platform coupled to the eyepiece, wherein the pixel array is configured to display images of various objects of a scene and the mechanized platform is configured to move the eyepiece toward and away from the pixel array.

11. The viewing system of claim 2, wherein the eyepiece further comprises a mechanically operated compound lens or a liquid crystal lens.

12. The viewing system of claim 1, wherein each additional pixel array further comprises at least one of an array of transparent light-emitting devices and light-emitting devices that are spaced to allow transmission of light.

13. The viewing system of claim 1, wherein each pixel array is selectively activated and deactivated to display images independent of or in combination with any other pixel array.

14. The viewing system of claim 1, wherein each pixel array emits light at a wavelength different from any other pixel array.

* * * * *